Figure 1:
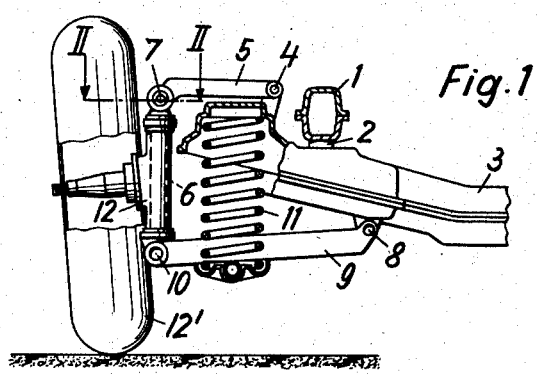

June 16, 1959  W. LAUKHUFF  2,890,893
CAMBER ADJUSTING DEVICE FOR MOTOR VEHICLE WHEELS
Filed Sept. 7, 1954

INVENTOR
WALTER LAUKHUFF
BY Dicke and Craig
ATTORNEYS.

United States Patent Office 2,890,893
Patented June 16, 1959

2,890,893

CAMBER ADJUSTING DEVICE FOR MOTOR VEHICLE WHEELS

Walter Laukhuff, Stuttgart-Bad Cannstatt, Germany, assignor to Daimler-Benz Aktiengesellschaft, Stuttgart-Unterturkheim, Germany Application September 7, 1954, Serial No. 454,519

Claims priority, application Germany September 9, 1953

13 Claims. (Cl. 280—96.2)

This invention relates to a device for the alignment or adjustment of vehicle wheels, in particular the camber of dirigible road wheels suspended on a pair of transversal swinging arms under employment of an eccentric in one of the pivotal connections of a swinging arm, preferably in the joint connecting the upper transversal swinging arm with the wheel carrier or steering knuckle pin, in particular for motor vehicles. It is understood that the term "wheel carrier" as used herein in connection with the present specification may also include the employment of a steering knuckle pin or another member adapted for steering the wheel, and likewise the term "frame" may also include the employment of a self-supporting car body, even if the same is not provided with a discrete frame.

More particularly, the present invention relates further to the employment of a frame member for supporting the wheel suspension and which on its part is suspended by rubber members or other resilient intermediate members on the remainder of the frame work. Experience has proved that particularly in the case of flexible suspension systems readjustment of wheel camber is necessary after a certain period of time, since after the original adjustment of the camber, the mounting of the suspension system in rubber may be changed spontaneously, or in case of employment of welded axle supports made from sheet-metal stampings, the welding may have given way.

A general object of the invention is to provide an adjusting device of the type referred to which is of simple, easily accessible construction ensuring accurate, easily controllable alignment and adjustment of the wheel, in particular the wheel camber.

Another object of the present invention is to provide an adjusting device of the kind described wherein the parts provided for adjusting purposes, in particular the eccentric members, are of sturdy practical construction and strong and reliable in use.

An essential feature of the present invention consists accordingly in a construction wherein a joint bolt, which connects one of the swinging arms with another part, in particular the wheel carrier or steering pivot, itself is formed as eccentric with bolt portions which are eccentric as to each other, in particular an intermediate portion of relatively small diameter having eccentric end portions of relatively large diameter in respect to the former. With this arrangement the wheel alignment or adjustment, for example, the camber may be adjusted to the proper angle simply by turning the bolt. Also, with an appropriately constructed device, camber adjustment may readily be made with a conventional wrench.

A further object of the invention is to provide an adjusting device of the kind described including means so designed as to make controlling of the wheel alignment very simple. For this purpose there is provided in an especially advantageous construction a bolt with means for its adjustment and with it for the adjustment of the eccentrics, which means consist preferably of a serrated member which is in engagement with a serrated segment detachably arranged on one of the parts to be connected. Special markings, for example, graduated in fractions of degrees of camber angle adjustment, may also be provided for checking purposes.

Figure 2:
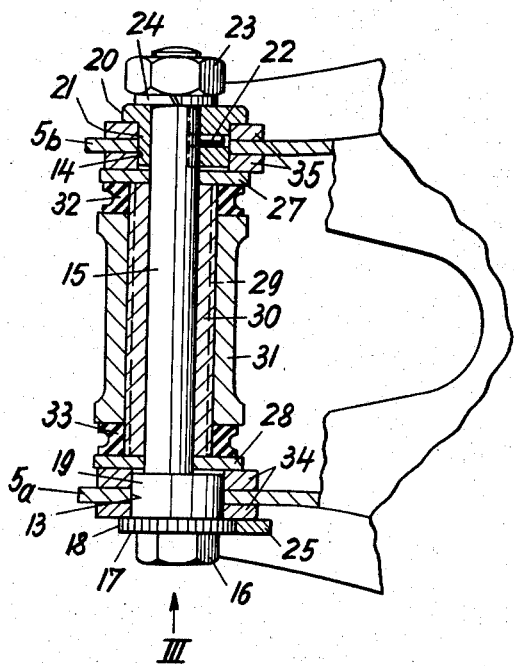
Figure 3:
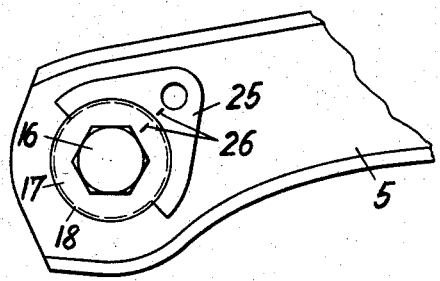

Other objects and features of the invention will become apparent from the following description taken in connection with the accompanying drawings which illustrate a preferred embodiment of the invention. In the drawings:

Fig. 1 is a view, partly in section and partly in elevation, of a wheel suspension system with double transversal swinging arms, Fig. 2 is a sectional view taken in the plane of line II—II in Fig. 1, showing the construction of the adjusting device, and Fig. 3 is an elevational view of Fig. 2 in the direction of arrow III.

A welded front axle support 3, made from sheet-metal stampings, is mounted by rubber cushions 2 on the frame 1 of a motor vehicle. The steering knuckle pin 6 is guided, on the one hand, by an upper transversal swinging arm 5 pivotally connected at 4 with a part of the axle support 3 and at 7 with a part of the steering knuckle pin, and on the other hand, by a lower transversal swinging arm 9 pivotally linked at 8 to the axle support 3 and at 10 to the steering knuckle pin. A coil spring 11 is mounted between the lower transversal swinging arm 9 and the axle support 3. The steering knuckle 12, which carries the road wheel 12', is also mounted on the steering knuckle pin 6.

As shown in Fig. 2 the upper transversal swinging arm 5, made from sheet-metal stampings, is forked at its end to form bearing arms 5a and 5b provided with bores constituting the bearings 13 and 14 respectively which are coaxial. A pin 15, provided at its one end with a tool-engageable hexagonal head portion 16 located at the outside of the bearing arm 5a, a projecting shoulder 17 having serrations 18, and an eccentric portion 19 corresponding to the bore 13, is mounted in the bearings. An eccentric part 21 corresponding to and coaxial with the eccentric portion 19 and provided with a collar 20 is inserted over the other end of the pin 15. Its bearing is the bore 14. It is held with the bolt 15 in the circumferential direction by a pin 22 engaging a groove. The pin 15 is axially secured to the transversal swinging arm by retaining means comprising a nut 23 and lock washer 24. In the joint bolt structure comprising the pin 15 and the eccentric part 21, the smooth surfaced coaxial end portions 19 and 21 are of a diameter greater than the diameter of the smooth surfaced intermediate portion of the pin 15. Furthermore, the outer surface of the intermediate portion of the pin 15 lies within the cylinder defined by the outer surfaces of the end portions 19 and 21 so that the small diameter portion of the pin 15 may be readily passed through the bore 13 in arm 5a during assembly of the bolt structure in the wheel suspension. The pin 22 permits the end portion 21 to slide axially of the pin 15, but prevents rotation of the end portion 21 when the latter is in place on the pin 15. A serrated segment 25 (Fig. 3) partly engaging the serrations 18 is detachably connected on the transversal swinging arm 5 in a conventional manner by means of a screw passing through the hole in the segment 25. Marks 26 on both the shoulder 17 and the serrated segment 25 permit checking of the camber adjustments.

A bushing 30, provided with external thread 29, is seated between the bearings 13, 14 and the spacing washers 27 and 28, the latter washers being disposed between the bushing 30 and the inside of the arms 5b and 5a, respectively. A mating internal thread of a part 31 of the steering knuckle pin is in threaded engagement with the thread 29 of said bushing 30. Rubber sealing rings 32, 33 are provided for sealing purposes at either end of the part 31 on the threaded bushing 30 between the part 31 and the washers 27 and 28, respectively.

For enlarging the bearing surfaces between the bearing arms and the eccentric portions 19 and 21, the arms are provided with reinforcement washers 34 and 35 which may either be loosely inserted or laterally welded to the arms on both sides thereof, such reinforced portions of the arms being clamped, respectively, between the spacing washers 27 and 28 at the inside and the shoulder 17 or collar 20 at the outside.

For adjusting, or respectively readjusting, the wheel camber, both the nut 23 of the pin 15 and the fastening means for the serrated segment 25 are loosened and the latter removed from its engagement with the serrations 18. The pin 15 can then be turned at its hexagonal portion by means of a suitable wrench. By the eccentric support of the pin 15 in the bearings 13, 14 through the medium of the eccentric portions 19, 21, the distance from the fulcrum point 7 to the pivotal point 4 of the transversal swinging arm 5 will be changed when the pin is turned and consequently the wheel camber adjusted.

It will be obvious that the details of construction may be varied from those shown in the drawings. I therefore do not limit myself to such details.

What I claim is:

1. In a vehicle wheel suspension, a wheel carrier, a forked swinging arm with two fork arms embracing said wheel carrier on either side, a transverse opening in said wheel carrier, a transverse opening in each of said fork arms, a joint bolt extending through said openings, said joint bolt consisting of an intermediate bolt portion of relatively small diameter supported in said wheel carrier opening and an eccentric bolt end portion of relatively large diameter supported in the opening of one of said fork arms, an eccentric portion non-rotatably mounted on the other end of said joint bolt coaxially arranged as to said end portion and supported in the opening of said other fork arm, said eccentric portions being jointly rotatably adjustable in said arms, respectively, a shoulder on said first end portion abutting against said first fork arm from the outside thereof, and a retaining means on the other end of said joint bolt for retaining said eccentric portion axially upon said bolt and abutting against said second fork arm from the outside.

2. In a vehicle wheel suspension the combination according to claim 1, wherein said swinging arm with said fork arms is made of sheet metal, further comprising a reinforcement washer arranged at one side of each of said fork arms between said wheel carrier and said shoulder and said retaining means, respectively.

3. In a vehicle wheel suspension the combination according to claim 1, further comprising an externally threaded bushing surrounding said intermediate bolt portion and in threaded engagement with an internally threaded part of said wheel carrier, spacing washers between either end of said bushing and said fork arms, and sealing rings on either end of said bushing between said internally threaded part of said wheel carrier and said spacing washers.

4. In a vehicle wheel suspension, a frame, a carrier, a swinging member, means for pivotally connecting said swinging member with said frame, means for pivotally connecting said swinging member with said wheel carrier, one of said means comprising a joint bolt, openings through which said joint bolt extends arranged transversely to said swinging member in the adjacent ends of the two parts to be connected thereby, said joint bolt consisting of bolt portions eccentric as to each other, one of said bolt portions being supported in the opening of one of said ends and the other one of said bolt portions in the opening of the other one of said ends, and means for adjusting said joint bolt to a certain rotary position so as to adjust said wheel carrier to a certain position in relation to said frame, said adjusting means comprising a serrated portion on said joint bolt and a locking member arranged on one of the parts to be connected and provided with serrations engaging the serrated portion on said joint bolt, said locking member being formed as a forked serrated segment engaging the serrated portion on said joint bolt from one side, and means for detachably connecting said serrated segment to the part by which it is carried.

5. In a vehicle wheel suspension the combination according to claim 4, further comprising markings on the serrated portion of said joint bolt on the one hand, and on said locking member on the other hand.

6. In a vehicle wheel suspension, a wheel carrier, a forked swinging arm with two fork arms embracing said wheel carrier on either side, a transverse opening in said wheel carrier, a transverse opening in each of said fork arms, a joint bolt extending through said openings, said joint bolt consisting of an intermediate bolt portion of relatively small diameter supported in said wheel carrier opening and a bolt end portion of relatively large diameter supported in the opening of one of said fork arms, an eccentric portion non-rotatably mounted on the other end of said joint bolt coaxially arranged as to said end portion and supported in the opening of said other fork arm, a shoulder on said first end portion abutting against said fork arm from the outside thereof, and a retaining means on the other end of said joint bolt for retaining said eccentric portion axially upon said bolt and abutting against said second fork arm from the outside thereof, said shoulder being provided with serrations, a serrated segment cooperating with said serrated shoulder, and means for detachably connecting said segment to said fork arm serving for supporting said first end portion.

7. In a vehicle suspension, a frame, a wheel carrier, a swinging member and means forming a pivotal connection at each end of said member between a part thereof and a part of one of said frame and said carrier, one of said parts at one of said pivotal connections comprising a pair of spaced arms having coaxial bores therein, the other part at said last-mentioned connection being disposed between said arms and having a passage therein generally parallel to and eccentric to the axis of said bores, a joint bolt structure including coaxial end portions secured in said bores, respectively, and a smooth intermediate bolt portion of smaller diameter than said end portions journalled in the passage of said other part to pivotally connect the parts at said last-mentioned connection, and means including a tool-engageable portion of said joint bolt structure accessible at the outside of one of said arms for rotatably adjusting said joint bolt structure to a certain position to adjust the camber of the wheel carrier, one of said end portions and said intermediate bolt portion being integral.

8. In a vehicle wheel suspension, the combination according to claim 7, wherein said adjusting means includes a polygonal head on said joint bolt structure accessible at the outside of one of said arms and coaxial with said end portions.

9. In a vehicle wheel suspension the combination according to claim 7, further comprising marking means on said adjusting means adapted for indicating the wheel carrier position.

10. In a vehicle suspension, a frame, a wheel carrier, a swinging member and means forming a pivotal connection at each end of said member between a part thereof and a part of one of said frame and said carrier, one of said parts at one of said pivotal connections comprising a pair of spaced arms having coaxial bores therein, the other part at said last-mentioned connection being disposed between said arms and having a passage therein generally parallel to and eccentric to the axis of said bores, a joint bolt structure including coaxial end portions secured in said bores, respectively, and a smooth intermediate bolt portion of smaller diameter than said end portions journalled in the passage of said other part to pivotally connect the parts at said last-mentioned connection, and means for rotatably adjusting said joint bolt structure to a certain position to adjust the camber of the wheel carrier, said end portions being fixed against rotation relative said intermediate bolt portion, one of said end portions being axially slidable on said bolt structure.

11. In a vehicle suspension, a frame, a wheel carrier, a swinging member and means forming a pivotal connection at each end of said member between a part thereof and a part of one of said frame and said carrier, one of said parts at one of said pivotal connections comprising a pair of spaced arms having coaxial bores therein, the other part at said last-mentioned connection being disposed between said arms and having a passage therein generally parallel to and eccentric to the axis of said bores, a joint bolt structure including coaxial end portions secured in said bores, respectively, and a smooth intermediate bolt portion of smaller diameter than said end portions journalled in the passage of said other part to pivotally connect the parts at said last-mentioned connection, and means including a tool-engageable portion of said joint bolt structure accessible at the outside of one of said arms for rotatably adjusting said joint bolt structure to a certain position to adjust the camber of the wheel carrier, the outer surface of said intermediate bolt portion lying within a cylinder defined by bearing surfaces of the end portions of said bolt structure in said bores, one of said end portions and said intermediate bolt portion being integral.

12. In a vehicle suspension, a frame, a wheel carrier, a swinging member and means forming a pivotal connection at each end of said member between a part thereof and a part of one of said frame and said carrier, one of said parts at one of said pivotal connections comprising a pair of spaced arms having coaxial bores therein, the other part at said last-mentioned connection being disposed between said arms and having a passage therein generally parallel to and eccentric to the axis of said bores, a joint bolt structure including coaxial end portions secured in said bores, respectively, and a smooth intermediate bolt portion of smaller diameter than said end portions journalled in the passage of said other part to pivotally connect the parts at said last-mentioned connection, means for rotatably adjusting said joint bolt structure to a certain position to adjust the camber of the wheel carrier, said adjusting means comprising a serrated portion on said joint bolt structure and a serrated locking member engaging said serrated portion and secured to one of the parts to be pivotally connected by said bolt structure.

13. In a vehicle suspension, a frame, a wheel carrier, a swinging member and means forming a pivotal connection at each end of said member between a part thereof and a part of one of said frame and said carrier, one of said parts at one of said pivotal connections comprising a pair of spaced arms having coaxial bores therein, the other part at said last-mentioned connection being disposed between said arms and having a passage therein generally parallel to and eccentric to the axis of said bores, a joint bolt structure including coaxial end portions secured in said bores, respectively, and a smooth intermediate bolt portion of smaller diameter than said end portions journalled in the passage of said other part to pivotally connect the parts at said last-mentioned connection, means for rotatably adjusting said joint bolt structure to a certain position to adjust the camber of the wheel carrier, said adjusting means comprising a serrated portion provided at one end of said joint bolt structure beyond one of said arms, a serrated locking member engaging said serrated portion, and means for detachably connecting said locking member with said last-mentioned arm.

References Cited in the file of this patent

UNITED STATES PATENTS

| Number | Name | Date |
| --- | --- | --- |
| 2,123,087 | Leighton | July 5, 1938 |
| 2,153,083 | Griswold | Apr. 4, 1939 |
| 2,153,271 | Paton | Apr. 4, 1939 |
| 2,198,544 | Leighton | Apr. 23, 1940 |
| 2,226,406 | Krotz | Dec. 24, 1940 |
| 2,238,879 | Dauben | Apr. 22, 1941 |
| 2,255,088 | Schroeter | Sept. 9, 1941 |
| 2,428,086 | Leighton | Sept. 30, 1947 |
| 2,502,744 | Parker | Apr. 4, 1950 |
| 2,509,285 | Bendicsen | May 30, 1950 |
| 2,631,866 | Leighton | Mar. 17, 1953 |
| 2,713,484 | Pierce | July 19, 1955 |